United States Patent
Kraus et al.

(10) Patent No.: US 10,138,943 B2
(45) Date of Patent: Nov. 27, 2018

(54) DRIVETRAIN COMPONENT CONNECTING SYSTEM

(71) Applicant: FORD GLOBAL TECHNOLOGIES, LLC, Dearborn, MI (US)

(72) Inventors: Robert Thomas Kraus, Shelby Township, MI (US); Scott David Beiring, South Lyon, MI (US); Kurt Stecker, Roseville, MI (US); Peter Scheuer, Monclova, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 115 days.

(21) Appl. No.: 15/147,515

(22) Filed: May 5, 2016

(65) Prior Publication Data

US 2017/0321757 A1    Nov. 9, 2017

(51) Int. Cl.
| | |
|---|---|
| *F16D 3/06* | (2006.01) |
| *F16D 1/10* | (2006.01) |
| *F16D 1/06* | (2006.01) |
| *F16D 1/08* | (2006.01) |
| *F16D 3/223* | (2011.01) |

(52) U.S. Cl.
CPC ........... *F16D 1/10* (2013.01); *F16D 1/06* (2013.01); *F16D 1/0858* (2013.01); *F16D 1/101* (2013.01); *F16D 3/223* (2013.01); *F16D 2001/103* (2013.01); *F16D 2003/22326* (2013.01); *Y10S 464/906* (2013.01); *Y10T 403/7033* (2015.01)

(58) Field of Classification Search
CPC ........ F16D 1/06; F16D 1/10; F16D 2001/103; Y10S 464/906; Y10T 403/7033
USPC ................................................ 464/182
See application file for complete search history.

(56) References Cited

U.S. PATENT DOCUMENTS

| | | | |
|---|---|---|---|
| 6,280,339 B1* | 8/2001 | Yaegashi | F16C 3/03 |
| 7,288,029 B1* | 10/2007 | Lyon | F16C 3/03 |
| 7,377,854 B2 | 5/2008 | Wormsbaecher | |
| 7,478,969 B2 | 1/2009 | Kozlowski et al. | |
| 7,553,238 B2 | 6/2009 | Wormsbaecher et al. | |
| 7,712,994 B2 | 5/2010 | Cermak | |
| 7,867,099 B2 | 1/2011 | Szentmihalyi et al. | |
| 8,025,454 B2 | 9/2011 | Cermak | |
| 8,220,581 B2 | 7/2012 | Buchwitz et al. | |
| 8,784,220 B1 | 7/2014 | Katke | |
| 8,864,590 B2 | 10/2014 | Sugiyama et al. | |
| 2014/0121029 A1 | 5/2014 | Oh | |
| 2015/0321511 A1* | 11/2015 | Mochinaga | B60B 27/0005 |

FOREIGN PATENT DOCUMENTS

| | | |
|---|---|---|
| JP | 2001343023 A2 | 12/2001 |
| WO | 2015095130 A2 | 6/2015 |

* cited by examiner

*Primary Examiner* — Greg Binda
(74) *Attorney, Agent, or Firm* — James Dottavio; Brooks Kushman P.C.

(57) ABSTRACT

A vehicle includes a first drivetrain component and a second drivetrain component. The first drivetrain component defines a splined orifice. The second drivetrain component has a shaft that includes splines that are configured to clearance-fit the splined orifice upon engagement up to a first length and interference-fit the splined orifice upon engagement beyond the first length. Engagement of the splines and the splined orifice at substantially the first length counteracts loads perpendicular to an axis of the shaft preventing disengagement of the first and second drivetrain components.

15 Claims, 4 Drawing Sheets

DRIVETRAIN COMPONENT CONNECTING SYSTEM

TECHNICAL FIELD

The present disclosure relates to drivetrain components and a system of connecting various drivetrain components.

BACKGROUND

Mating components of a vehicle drivetrain may be connected to each other through various means or methods. One type of connection includes inserting a splined shaft of a first component into a splined orifice defined by a second component.

SUMMARY

A vehicle includes a first drivetrain component and a second drivetrain component. The first drivetrain component defines a splined orifice. The second drivetrain component has a shaft that includes splines that are configured to clearance-fit the splined orifice upon engagement up to a first length and interference-fit the splined orifice upon engagement beyond the first length. Engagement of the splines and the splined orifice at substantially the first length counteracts loads perpendicular to an axis of the shaft preventing disengagement of the first and second drivetrain components.

A vehicle includes a drive shaft, a first constant-velocity joint, a second constant-velocity joint, a transmission output shaft, and a differential input shaft. The first and second constant-velocity joints are secured at opposing ends of the driveshaft. Each of the constant-velocity joints defines splined orifices. The transmission output shaft includes splines that are configured to clearance-fit the splined orifice defined by the first constant-velocity joint upon engagement up to a first length and interference-fit the splined orifice defined by the first constant-velocity joint upon engagement beyond the first length. Engagement of the splines of the transmission output shaft and the splined orifice defined by the first constant-velocity joint at substantially the first length counteracts loads perpendicular to an axis of the transmission output shaft preventing disengagement of the transmission output shaft and the first constant-velocity joint. The differential input shaft includes splines configured to clearance-fit the splined orifice defined by the second constant-velocity joint upon engagement up to a second length and interference-fit the splined orifice defined by the second constant-velocity joint upon engagement beyond the second length. Engagement of the splines of the differential input shaft and the orifice defined by the second constant-velocity joint at substantially the second length counteracts loads perpendicular to an axis of the differential input shaft preventing disengagement of the differential input shaft and the second constant-velocity joint.

A method includes manually securing a drivetrain shaft to a constant-velocity joint by engaging a splined section of the shaft with a splined orifice defined by the constant-velocity joint such that a portion of the splined section engages and clearance-fits the splined orifice, while a remainder of the splined section remains disengaged from the splined orifice, and machine pressing the constant-velocity joint such that the remainder of the splined section engages and interference-fits the splined orifice.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
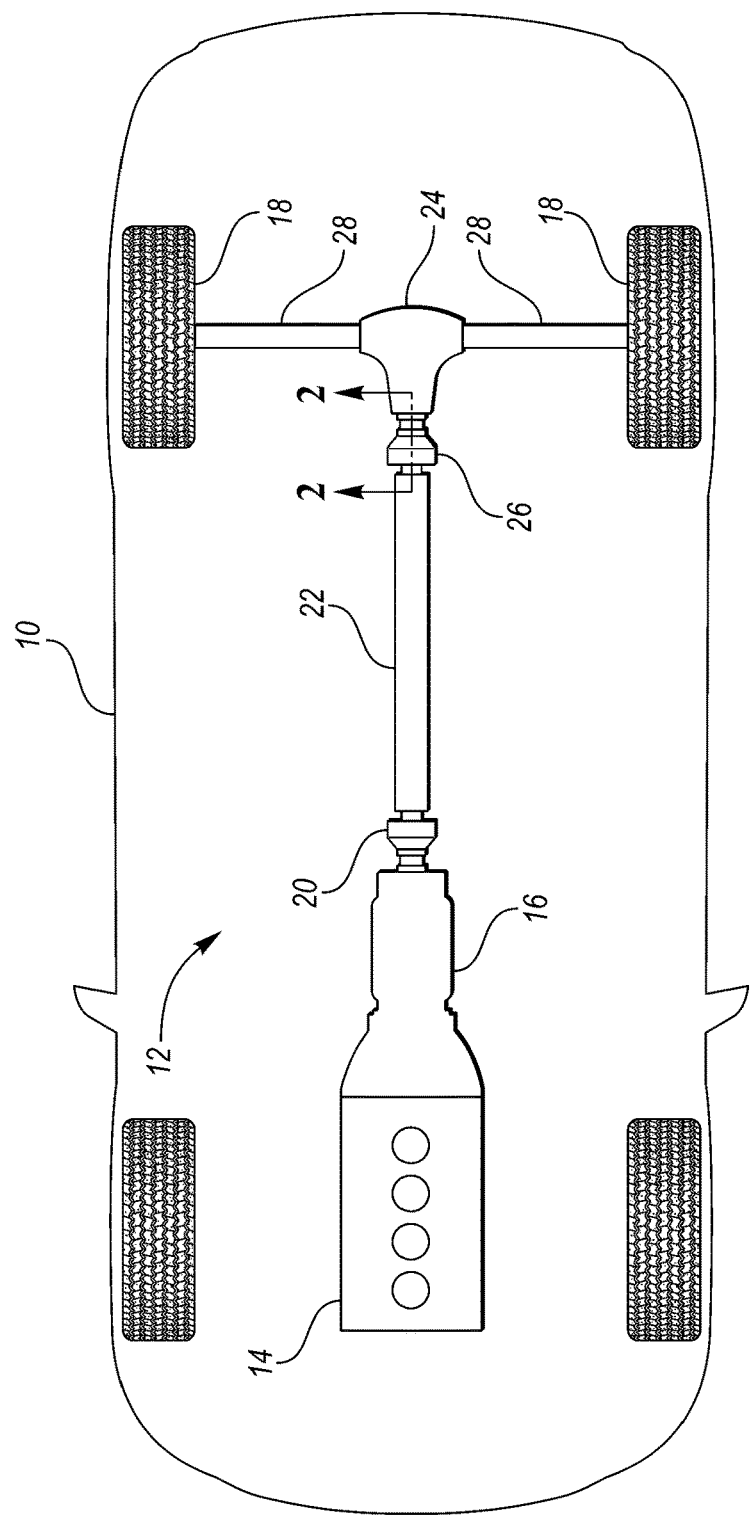
FIG. 1 is a schematic diagram representative of a vehicle and a vehicle powertrain.

Referring to FIG. 1, a schematic diagram representative of a vehicle 10 and a vehicle powertrain 12 is illustrated. The powertrain 12 includes power generating components (i.e., engines or electric motors) and the drivetrain. The drivetrain is the group of components that deliver power to the driving wheels, excluding the power generating components. In contrast, the powertrain 12 is considered to include both the power generating components and the drivetrain. The powertrain 12 includes an engine 14 and a transmission 16. The transmission 16 may be configured to provide multiple gear ratios between an input and an output of the transmission 16. The engine 14 is connected to the input of the transmission 16 while drivetrain components that are configured deliver power to driving wheels 18 are connected to an output of the transmission 16. More specifically, a first constant-velocity joint 20 may connect the output of the transmission 16 to a driveshaft 22. The driveshaft 22 may then be connected to a differential 24 by a second constant-velocity joint 26. The differential may then be connected to the driving wheels 18 by half shafts 28. Additional constant-velocity joints (not shown) may connect the differential 24 to the half shafts 28 and/or connect the half shaft 28 to hubs of the driving wheels 18.

The driving wheels 18 depicted in FIG. 1 are shown as rear wheels of the vehicle 10. However, it should be understood that the front wheels may also be driving wheels. For example, the front wheels may be connected to the transmission 16 through a series of drivetrain components such as driveshafts, half shafts, differentials, transfer cases, constant-velocity joints, etc. in a manner similar to how the rear wheels are connected to the transmission 16, but not necessarily in the same order or configuration. Furthermore, although an engine 14 is shown to be the power generating component of the powertrain 12, other power generating components (i.e., electric motors or fuel cells) may be used in place of or in addition to (such as with hybrid vehicles) the engine 14.

It should be understood that the vehicle configuration described herein is merely exemplary and is not intended to be limited. Other non-hybrid, electric, or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Figure 2:
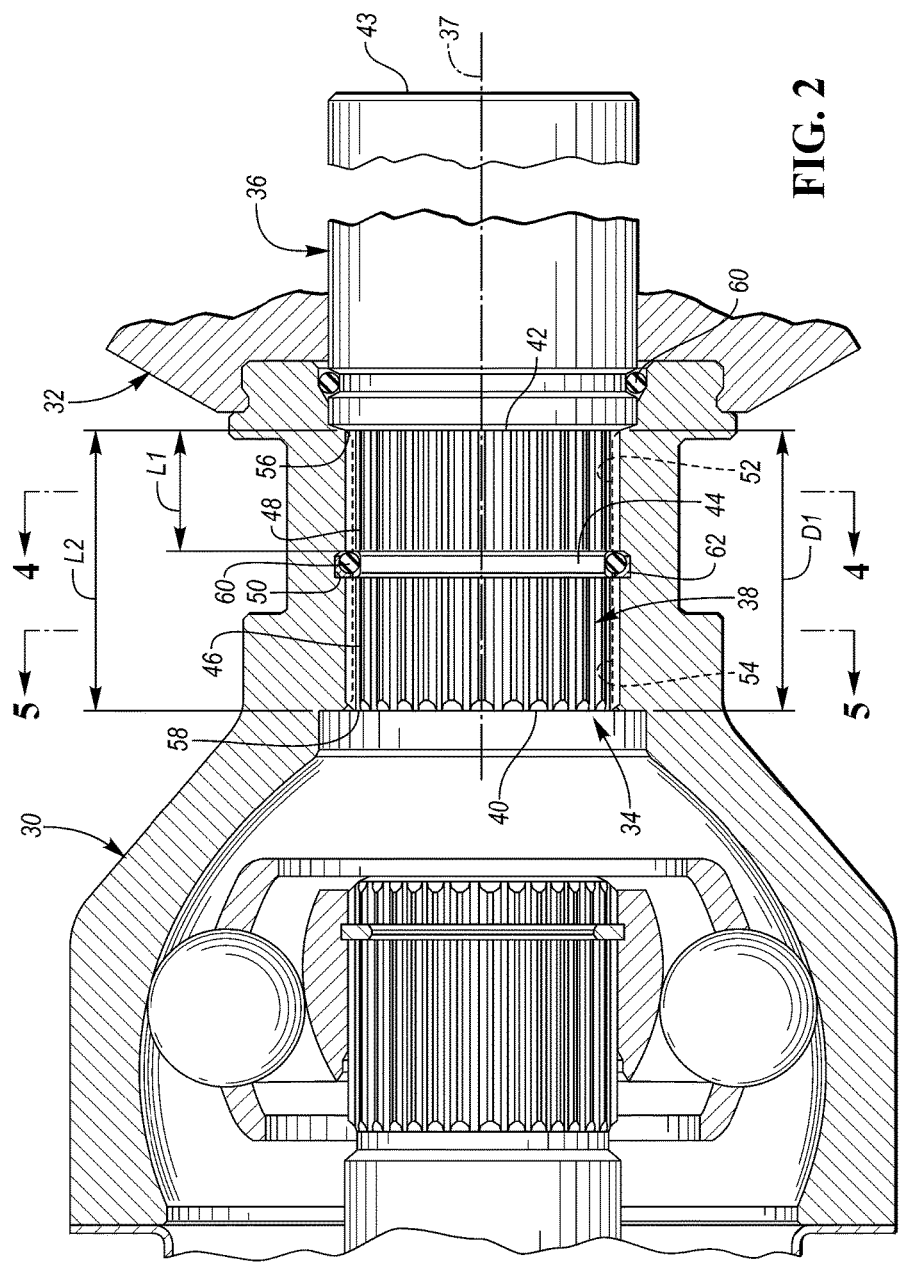
FIG. 2 is a partial cross-sectional view taken along line 2-2 in FIG. 1.

Referring to FIG. 2, a partial cross-sectional view taken along line 2-2 in FIG. 1 is illustrated. The cross-sectional view in FIG. 2 illustrates a splined connection between the second constant-velocity joint 26 and the differential 24. Specifically, it illustrates the connection between a splined orifice defined by the second constant-velocity joint 26 and an input shaft of the differential 24. However, it should be understood that FIG. 2 may be illustrative of any splined connection within the powertrain 12. For example, FIG. 2 may also be illustrative of a splined connection between an output shaft of the transmission 16 and a splined orifice defined by the first constant-velocity joint 20 or any other splined connection involving constant-velocity joints and other drivetrain components such as driveshafts, half shafts, differential outputs, hubs to driving wheels, etc. Since FIG. 2 may be representative of any splined connection within the powertrain 12, the second constant-velocity joint 26 will be referred to as the first drivetrain component 30 and the differential 24 will be referred to as the second drivetrain component 32.

Figure 4:
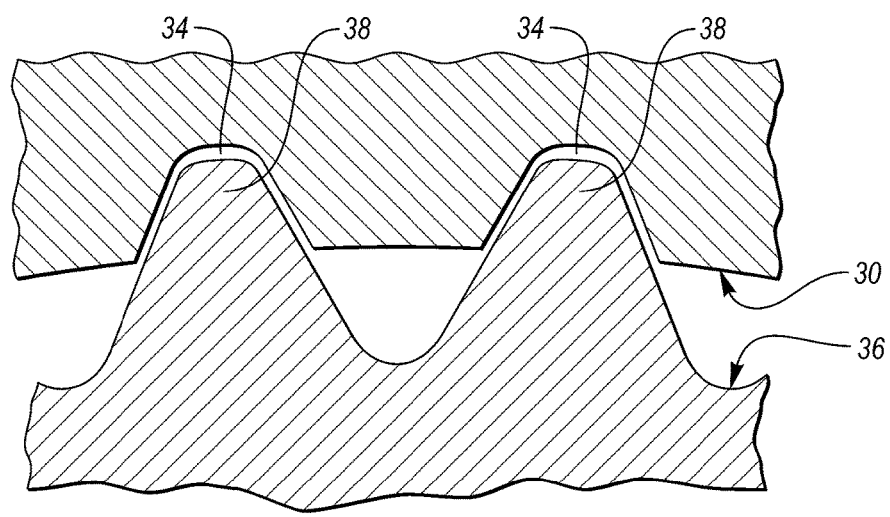
FIG. 4 is a partial cross-sectional view taken along line 4-4 in FIG. 2 illustrating a clearance-fit between a splined shaft and a splined orifice.
Figure 5:
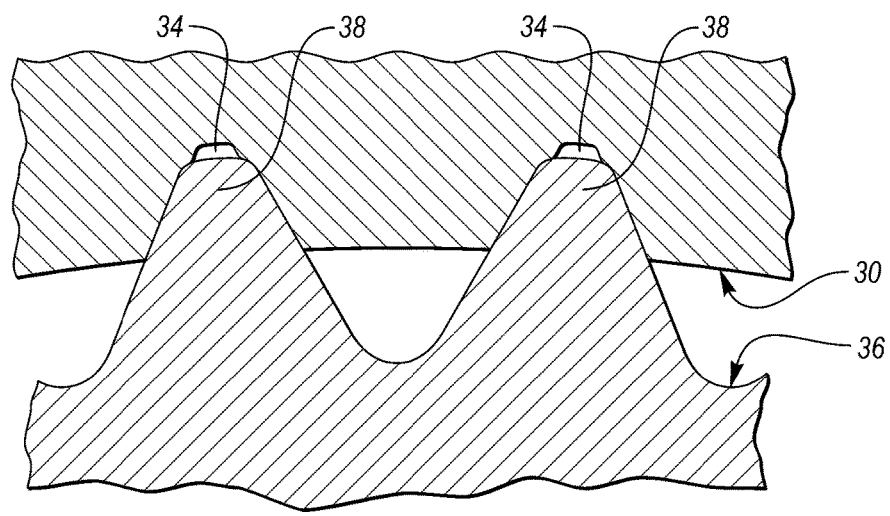
FIG. 5 is a partial cross-sectional view taken along line 5-5 in FIG. 2 illustrating an interference-fit between a splined shaft and a splined orifice.

The first drivetrain component 30 defines a splined orifice 34. The second drivetrain component 32 has a shaft 36 that includes splines 38 that are configured to engage the splined orifice 34 of the first drivetrain component 30 in order to couple the first drivetrain component 30 to the second drivetrain component 32. The splines 38 of the shaft 36 are configured to clearance-fit (i.e., slip-fit) the splined orifice 34 upon engagement up to a first length L1 and interference-fit (i.e., press-fit) the splined orifice 34 upon engagement beyond the first length L1. A clearance-fit between the splines 38 and the splined orifice 34 is illustrated in FIG. 4. An interference-fit between the splines 38 and the splined orifice 34 is illustrated in FIG. 5. Engagement of the splines 38 and the splined orifice 34 at substantially the first length L1 counteracts loads perpendicular to an axis 37 of the shaft 36 to prevent disengagement of the first drivetrain component 30 and second drivetrain component 32. Engagement of the splines 38 and the splined orifice 34 at substantially the first length L1 also reduces or eliminates the uneven distribution of mass about the driveline's axis of rotation. Engagement of the splines 38 and the splined orifice 34 at substantially the first length L1 may include engagement at the first length L1 plus or minus 0 mm up to 5 mm, including any incremental value in between. The loads perpendicular to the axis 37 of the shaft 36 may correspond to loads caused by the weight of individual or multiple components of the powertrain 12. For example, if the first drivetrain component 30 is a constant-velocity joint that is affixed to a driveshaft, the engagement of the splines 38 and the splined orifice 34 at substantially the first length L1 will counteract the loads produced by the weight of the constant-velocity joint and the driveshaft to prevent disengagement of the first drivetrain component 30 and second drivetrain component 32. An interference-fit between the splines 38 and the splined orifice 34 may be either a top-fit type or side-fit type interference-fit. The length of engagement between the splines 38 and the splined orifice 34 may be based on how far a first end 40 of the shaft 36 extends into the splined orifice 34. FIG. 2 depicts the first end 40 of the shaft 36 extending into the splined orifice 34 along the entire length L2 the splined orifice 34. Since the entire length L2 of the splined orifice 34 is longer than the first length L1, FIG. 2 depicts an interference-fit between the splines 38 and the splined orifice 34. A clearance-fit engagement between the splines 38 and the splined orifice 34 would include the first end 40 of the shaft 36 extending into the splined orifice at the first length L1 or less.

The splines 38 extend inward from the first end 40 of the shaft 36 to a termination point 42 that is short of a second end 43 of the shaft 36. Engaging the splines 38 and the splined orifice 34 at the first length L1 includes engaging the splines from the first end 40 of the shaft 36 to at least half of the distance D1 from the first end 40 of the shaft to the termination point 42. The shaft 36 may define a first ring groove 44 that divides the splines 38 into a first splined section 46 and a second splined section 48. The first splined section 46 may extend from the first end 40 of the shaft 36 to the first ring groove 44. The second splined section 48 may extend from the first ring groove 44 to the termination point 42.

The first drivetrain component 30 may define a second ring groove 50 that divides the splined orifice 34 into a third splined section 52 and a fourth splined section 54. The third splined section 52 of the splined orifice 34 may extend from an opening 56 of the splined orifice 34 to the second ring groove 50. The fourth splined section 54 of the splined orifice 34 may extend from the second ring groove 50 to an end 58 of the splined orifice 34. The distance from the opening 56 of the splined orifice 34 to the end 58 of the splined orifice 34 corresponds to the length L2, which is the entire length of the splined orifice.

The first splined section 46 of the shaft 36 may be configured to clearance-fit the third splined section 52 of the splined orifice 34. The first splined section 46 of the shaft 36 may be configured to interference-fit the fourth splined section 54 of the splined orifice 34. Alternatively or in addition to the first splined section 46 of the shaft 36 being configured to interference-fit the fourth splined section 54 of the splined orifice 34, the second splined section 48 of the shaft 36 may be configured to interference-fit the third splined section 52 of the splined orifice 34.

The shaft 36 may include rubber seals 60 that are configured to prevent fluid from flowing between the first drivetrain component 30 and second drivetrain component 32. A retaining ring 62 may be disposed within both the first ring groove 44 and second ring groove 50 in order to restrict movement or prevent disengagement of the first drivetrain component 30 and second drivetrain component 32.

Figure 3:
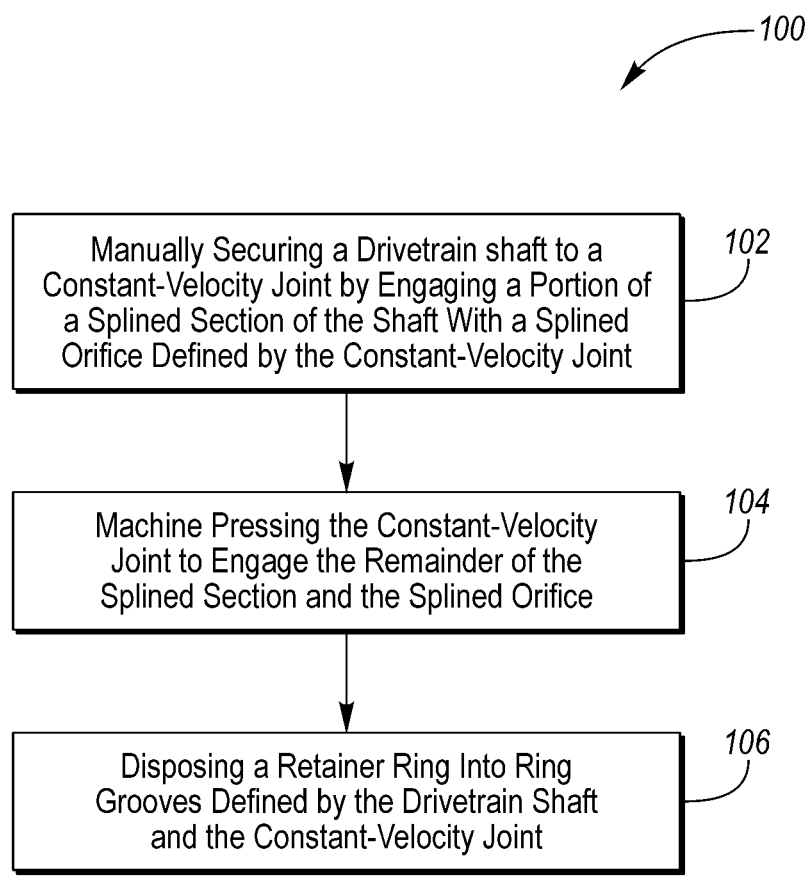
FIG. 3 is a flowchart illustrating a method of securing a drivetrain shaft to a constant-velocity joint.

Referring to the flowchart in FIG. 3, a method 100 of securing a drivetrain shaft to a constant-velocity joint is illustrated. The method begins at step 102 where a drivetrain shaft and a constant-velocity joint are secured to each other by engaging a splined section of the drivetrain shaft with a splined orifice defined by the constant-velocity joint such that a portion of the splined section engages and clearance-fits the splined orifice while a remainder of the splined section remains disengaged from the splined orifice. Step 102 may include engaging the splined section of the drivetrain shaft and the splined orifice in the same manner as described above to establish a clearance-fit engagement between the splines 38 of the shaft 36 and the splined orifice 34 of the first drivetrain component 30. Furthermore, step 102 may include engaging the splined section of the drivetrain shaft and the splined orifice of the constant-velocity joint during an overhead installation of one or more drivetrain components. More specifically, step 102 may comprise an overhead installation of a driveshaft that has constant-velocity joints secured to each end. The overhead installation may include engaging a splined orifice defined by the constant-velocity joint secured to the first end of the driveshaft with a transmission output shaft and engaging a splined orifice defined by the constant-velocity joint secured to the second end of the driveshaft with a differential input shaft. The clearance-fit engagement that is established between the splined section(s) of the drivetrain shaft(s) and the splined orifice(s) defined by the constant-velocity joint(s) should be sufficient to counteract loads perpendicular to the axis of the drivetrain shaft(s) in order to prevent disengagement of the drivetrain shaft(s) and the constant-velocity joint(s) in the same manner as described above.

After establishing a clearance-fit engagement between the splined section of the drivetrain shaft and the splined orifice defined by the constant-velocity joint, the method moves on to step 104 where the constant-velocity joint is machine pressed such that the remainder of the splined section engages and interference-fits the splined orifice. The constant-velocity joint may be machine pressed in any manner known in the art. For example, the method described in U.S. Pat. No. 9,695,878, which utilizes a power tool to engage a thrust feature in a constant-velocity joint in order to force the engagement between a splined section of a drivetrain shaft and a splined orifice of a constant-velocity joint, may be used to machine press the remainder of the splined section into the splined orifice. U.S. Pat. No. 9,695,878 is hereby incorporated into this application by reference in its entirety. Next, at step 106 a retainer ring may be disposed in ring grooves defined by both the drivetrain shaft and the constant-velocity joint in order to restrict movement or prevent disengagement of the drivetrain shaft and the constant-velocity joint. The retainer ring may be disposed in and engage the ring groove of the drivetrain shaft prior to the machine pressing step of 104. During the machine pressing step of 104 the retainer ring may be further disposed in and engage the ring groove defined by the constant-velocity joint.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
    a first drivetrain component defining a splined orifice; and
    a second drivetrain component having a shaft that includes splines configured to clearance-fit the splined orifice upon engagement up to a first length and interference-fit the splined orifice upon engagement beyond the first length, the shaft defining a first ring groove that divides the splines of the shaft into a first splined section that extends inward from a first end of the shaft to the first ring groove and a second splined section that extends inward from the first ring groove to a termination point short of a second end of the shaft, wherein an engagement at substantially the first length counteracts loads perpendicular to an axis of the shaft preventing disengagement of the first and second drivetrain components.

2. The vehicle of claim 1, wherein engaging the splines and the splined orifice at the first length includes engaging the splines from the first end of the shaft to at least half of the distance to the termination point.

3. The vehicle of claim 1, wherein the first drivetrain component defines a second ring groove that divides the splined orifice into a third splined section that extends from an opening of the orifice to the second ring groove and a fourth splined section that extends from the second ring groove to an end of the splined orifice.

4. The vehicle of claim 3, wherein the first splined section of the shaft is configured to clearance-fit the third splined section of the orifice.

5. The vehicle of claim 4, wherein the first splined section of the shaft is configured to interference-fit the fourth splined section of the orifice.

6. The vehicle of claim 4, wherein the second splined section of the shaft is configured to interference-fit the third splined section of the orifice.

7. The vehicle of claim 3, further comprising a retaining ring disposed within the first ring groove and the second groove restricts movement of the first drivetrain component relative to the second drivetrain component.

8. The vehicle of claim 1, wherein the first drivetrain component is a constant-velocity joint and the second drivetrain component is a differential.

9. The vehicle of claim 8, wherein the constant-velocity joint is disposed between the differential and a drive shaft.

10. A vehicle comprising:
    a drive shaft;
    first and second constant-velocity joints secured at opposing ends of the drive shaft and each defining splined orifices;
    a transmission output shaft that includes splines configured to clearance-fit the splined orifice defined by the first constant-velocity joint upon engagement up to a first length and interference-fit the splined orifice defined by the first constant-velocity joint upon engagement beyond the first length, the output shaft defining a ring groove that divides the splines of the output shaft into a first splined section that extends inward from a first end of the output shaft to the ring groove and a second splined section that extends inward from the ring groove to a termination point short of a second end of the shaft, wherein an engagement at substantially the first length counteracts loads perpendicular to an axis of the transmission output shaft preventing disengagement of the transmission output shaft and the first constant-velocity joint; and
    a differential input shaft that includes splines configured to clearance-fit the splined orifice defined by the second constant-velocity joint upon engagement up to a second length and interference-fit the splined orifice defined by the second constant-velocity joint upon engagement beyond the second length, wherein an engagement at substantially the second length counteracts loads perpendicular to an axis of the differential input shaft preventing disengagement of the differential input shaft and the second constant-velocity joint.

11. The vehicle of claim 10, wherein the splines of the transmission output shaft extend inward from the first end of the transmission output shaft to the termination point short of the second end of the transmission output shaft.

12. The vehicle of claim 11, wherein engaging the splines of the transmission output shaft and the splined orifice of the first constant-velocity joint at the first length includes engaging the splines from the first end of the transmission output shaft to at least half of the distance to the termination point.

13. The vehicle of claim 10, wherein the splines of the differential input shaft extend inward from a first end of the differential input shaft to a termination point short of a second end of the differential input shaft.

14. The vehicle of claim 13, wherein engaging the splines of the differential input shaft and the splined orifice of the second constant-velocity joint at the second length includes engaging the splines from the first end of the differential input shaft to at least half of the distance to the termination point.

15. A vehicle comprising:
 a constant-velocity joint defining a splined orifice; and
 a shaft having first and second ends and splines extending from the first end to a point short of the second end, wherein the shaft defines a ring groove that divides the splines into a first section that clearance-fits the splined orifice and a second section that interference-fits the splined orifice upon complete spline engagement with the splined orifice.

* * * * *